No. 822,987. PATENTED JUNE 12, 1906.
F. W. ROLLER.
ELECTRICAL MEASURING INSTRUMENT.
APPLICATION FILED JULY 18, 1904.
2 SHEETS—SHEET 2.
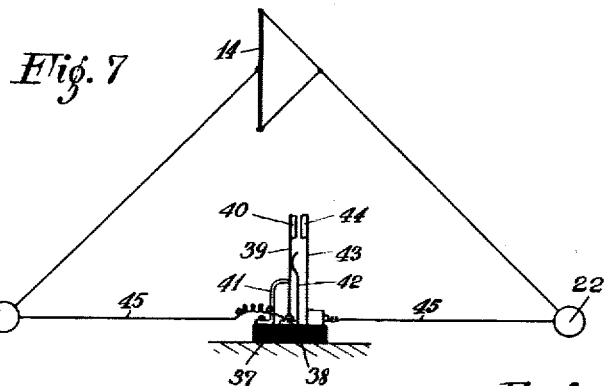
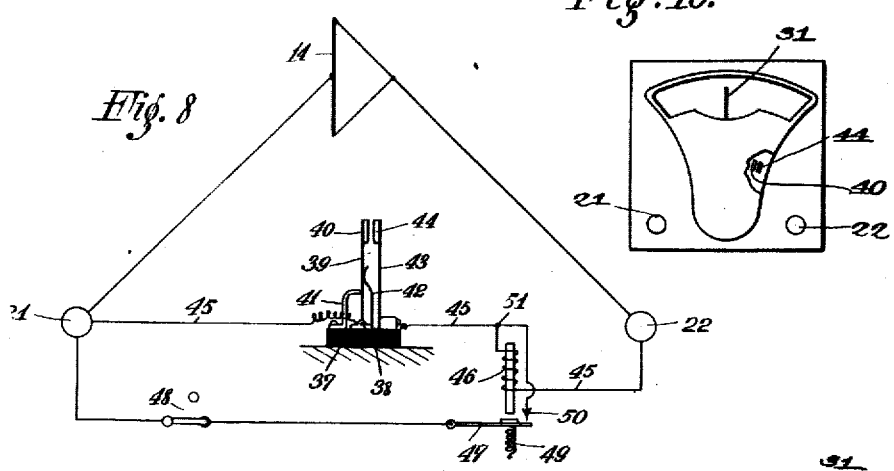
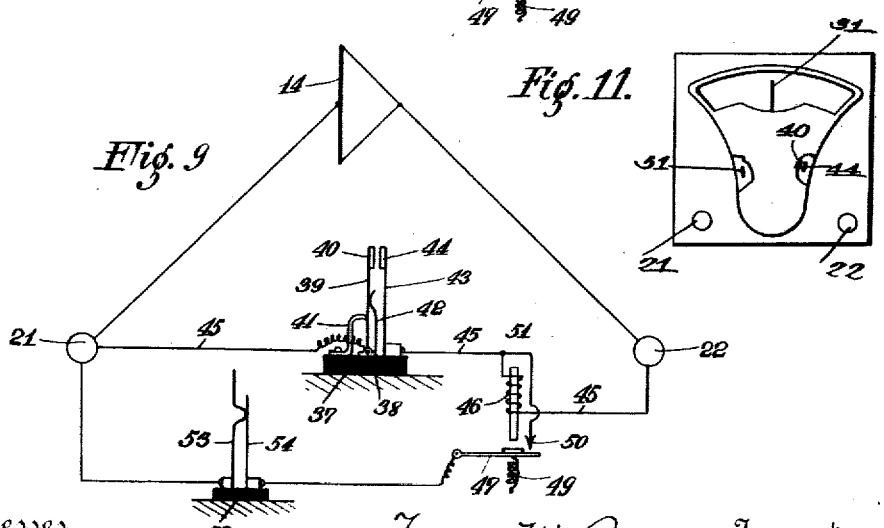
Witnesses
L. K. Sager.
Geo. A. Hoffman.
Frank W. Roller Inventor
By his Attorney C. N. Edwards

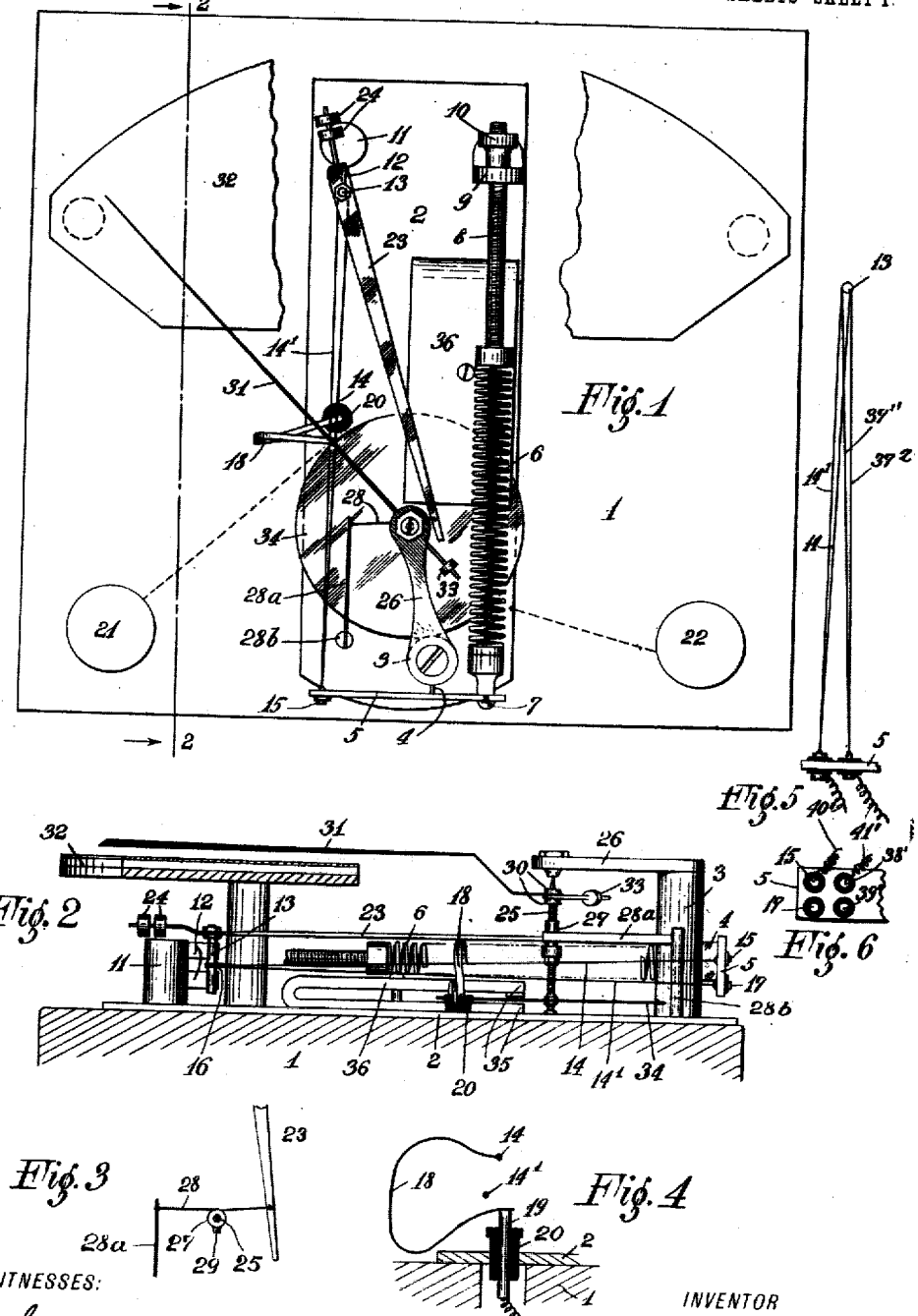

UNITED STATES PATENT OFFICE.

FRANK W. ROLLER, OF PLAINFIELD, NEW JERSEY.

ELECTRICAL MEASURING INSTRUMENT.

No. 822,987.

Specification of Letters Patent.

Patented June 12, 1906.

Application filed July 18, 1904. Serial No. 216,946.

*To all whom it may concern:*

Be it known that I, FRANK W. ROLLER, a citizen of the United States, residing at Plainfield, in the county of Union and State of New Jersey, have invented certain new and useful Improvements in Electrical Measuring Instruments, of which the following is a full, clear, and exact specification.

My invention relates to electrical measuring instruments, and particularly to that type for measuring current or voltage in which the movement of the pointer is determined by the expansion of a wire heated by current passing through the instrument.
The object of my invention is the production of an instrument which will have a high degree of accuracy, be free from any possibility of injury from excessive overloads, be capable of use in any convenient position, be unaffected by changes in temperature of the surrounding medium, unaffected by any neighboring magnetic field, as when placed near dynamo-electric machines, and overcome various objections to instruments previously used.

My invention will be understood by reference to the following description and accompanying drawings, which show the preferred form of my invention, and will be more particularly set forth in the claims.

Figure 1 is a plan view of an instrument embodying my invention with the case removed and part of the scale-plate broken away. Fig. 2 is a section on the line 2 2 of Fig. 1. Figs. 3 and 4 are details. Figs. 5 and 6 are plan and end views, respectively, of a modified arrangement of the tension-wires. Fig. 7 illustrates diagrammatically my improved short-circuiting device. Figs. 8 and 9 show modifications thereof. Fig. 10 is a plan view of an instrument with the case partly broken away and provided with my improved short-circuiting device. Fig. 11 is a similar view of a modification.
The base of the instrument is indicated at 1, and within this may be located, if desired, the shunt which carries the main portion of the current when the instrument is used as an ammeter or the high-series resistance when used as a voltmeter. To the base 1 is secured a metal plate 2, upon which the working parts of the instrument are mounted. From the post 3, which is secured to the plate 2, extends a thin strip of metal 4, and at right angles thereto is secured the tension-plate 5. The edges of the strip 4 are clamped in slots cut in the post 3 and plate 5, or the parts may be secured in any other desired manner. The plate 5 may be supported on a knife-edge or by a flexible strip at the opposite side of post 3 to that shown on the drawings, in which case the flexible strip would be in tension. A spiral spring 6 is connected by a pin 7 to the plate 5 at one end, and at the other end of the spring is secured a screw 8, which passes through a fixed post 9 and into a thumb-nut 10, so that turning the nut 10 varies the tension of the spring.

A second post 11 on the plate 2 has fixed thereto two thin metal strips 12, which support at their outer ends the pin 13. The strips 12 are soldered into a slot in post 11 and pass through slots in pin 13, the outer ends of the strips being expanded; but these parts may be secured in any other convenient manner. A wire in two parts, 14 14', is secured at one end 15 to the plate 5, passes around the pin 13 between the two strips 12 in the form of a thin strip 16, and is secured at its opposite end 17 to the plate 5. One end of the wire 15 makes electrical contact with the plate 5, and the other end 17 is insulated. The two ends 15 17 lie in a vertical plane, as shown in Fig. 1, and the part 16 is secured to pin 13, as by soldering. A flexible connection 18 is made from part 14 of the wire to a pin 19, which passes down through the plate 2, being insulated therefrom by the bushing 20, and connection is made in the base of the instrument from the pin 20 to one terminal 21 of the instrument, the other terminal 22 being connected to the plate 2.

A vane 23 is fixed to the pin 13, being counterbalanced by the weights 24. A shaft 25 is pivoted between two jewels, one in the plate 2 and the other carried by an arm 26, extending from post 3. Upon the shaft 25 is fixed a sleeve 27, which is encircled by a fiber 28, one end of this fiber being attached to vane 23, and the other end to a spring 28ᵃ, which latter is supported by a pin 28ᵇ from plate 2, and which tends to keep a slight tension on fiber 28. The fiber is attached to the sleeve 27 at one point, as by a screw 29.

Fixed to the shaft by the nuts 30 is an indicating-needle 31, which extends over a suitably-calibrated scale-plate 32. The needle is counterbalanced by the weight 33. Also carried by shaft 25 is a thin disk 34 of aluminium or other non-magnetic good conducting metal, which extends between the two poles 35 of the U-shaped permanent magnet 36, which arrangement tends to dampen the movement of the needle, as is well understood.

When no current passes through the instrument, the pin 13 is in what may be termed a "central" position, and the tension on the wires 14 14' is equal. This tension is adjustable to any desired amount by turning the thumb-nut 10, and so vary the tension on spring 6. As the ends 15 and 17 of the wires 14 14' lie in the same vertical plane, any increase in tension on the wires by the force of spring 6 is shared equally and there is no tendency to change the position of pin 13.

The path of the current through the instrument is from terminal 21 to pin 19, lead 18 to wire 14, and then divides and passes through the two halves of wire 14 in parallel and through the supporting parts to plate 2, and then to terminal 22. The passing of the current heats the wire 14 to a temperature depending upon the strength of the current, which causes the wire to expand correspondingly. When the wire 14 expands, the pin 13 will be turned slightly by reason of the pull exerted by spring 6 upon the wires which tends to equalize their tension. Hence as wire 14 becomes extended in length the pin 13 will be turned by the pull of wire 14' until the tension in the two wires becomes equal. The amount the pins turn therefore correctly indicates the strength of the current passing in the instrument. Such motion is reproduced and greatly amplified in the movement of the indicating-needle by the vane 23, fiber 28, and shaft 25.

My improved instrument is not affected by any change in the temperature of the surrounding medium, as the wires 14 and 14', being of the same material and same length, will expand and contract an equal amount upon any change in temperature of the whole instrument, which equal expansion or contraction will be taken up or allowed for by the spring 6 without any change in the position of the indicating-needle.

The form above described is suitable for an ammeter, as the two halves of the wire 14 in parallel have a comparatively low resistance, and for the measurement of large current the instrument is placed in parallel with a low-resistance shunt.

A modified arrangement of the wires is incated in Figs. 5 and 6, which arrangement is more suitable for a voltmeter. In a voltmeter the current passing is usually so small that in order to obtain the necessary expansion the cross-section of the wire required is so much reduced that it may not have sufficient mechanical strength. I therefore use in the modified construction referred to two very small wires in series. To the plate 5 are secured, as before, the ends of the wires 14 14', which extend to the pin 13. A second pair of wires 37'' 37' are also secured to the plate 5 with the ends 38' 39' in the same vertical plane and pass to the pin 13 and arranged similarly to wires 14 14'. With this modified construction the ends 15, 17, 38', and 39' are insulated from plate 5 and the pin 13 or its support is also insulated. The current is lead from one terminal of the instrument by wire 40' to the end 15 and passes through wire 14 to pin 13, which, as stated, is insulated from the plate 2, and the current then passes back through the wire 37'' to the end 38' and then by wire 41' to the other terminal of the instrument. As the wires 14 and 37'' pass to the same side of pin 13 and each carry the same current, the two pairs of wires act to deflect the needle in the same manner as the wires 14 14'.

If desired, the pin 13 may be in the form of a vertically-pivoted shaft, but with such an arrangement the friction of the pivoted shaft due to the side pull of the wires would be objectionable.

I also provide special means for protecting the instrument from excessive overloads. A large overload may not only cause the burning out of the instrument, but with this particular type of instrument excessive overloads are objectionable, as if the current-carrying wire is overheated the physical properties of the wire are changed to some degree, which may slightly affect the accuracy of the instrument. I therefore introduce a device by which the current is shunted when the value of the same exceeds a certain amount. This device may be used upon any type of instrument, but is particularly desirable in connection with hot wire instruments. My safety device is illustrated in Figs. 7, 8, and 9, and is not shown on Figs. 1 and 2, to avoid confusion of the drawings. In a suitable position on the instrument I mount a short-circuiting device in the path of the needle, so that when the needle attains its maximum deflection it will cause the instrument to be short-circuited.

Referring to Fig. 7 there is illustrated a small block of insulating material 37, carrying a pin 38, upon which is hinged the metal strip 39, carrying at its extremity the contact-piece 40. The strip 39 is pressed against a stop 41 by a light spring 42, both of which are mounted upon the insulating-block 37 in any convenient manner. A second strip 43 is mounted upon the block 37, and carries a contact 44, facing the contact 40. Connection is made from the terminals 21 22 of the instrument to the strips 39 and 43, as indicated by the wires 45. The block 37 is so located on the instrument that the hinged strip 39 is in the path of the indicating-needle 31, so that when the needle reaches the maximum deflection it strikes against the plate 39 and moves the same against the pressure of spring 42. This causes the engagement of contacts 40 and 44 and a direct path for the current is made between terminals 21 and 22. The wire 14, which is indicated in Fig. 7, or any other conducting parts of the instrument, will thus be short-circuited. With this arrangement, as soon as the temperature of wire 14 decreases on account of being short-circuited the indicating-needle will move toward the zero position of the scale and the contacts 40 and 44 will separate. This causes the full current to again pass through wire 14, and unless the overload were removed the needle would continually cause the making and breaking of the circuit through the wire 45.

Fig. 8 illustrates an arrangement in which the short circuit through wire 45 is maintained until broken by the operator or by failure of current. In Fig. 8 the parts are similar to those shown in Fig. 7, except that the coil 46 of the electromagnet is included in the circuit 45. The electromagnet has a pivoted armature 47 electrically connected with terminal 21 through switch 48. When the armature 47 is attracted against gravity or the spring 49, it engages the contact 50, which is electrically connected with wire 45 at 51. When the contacts 40 and 44 are brought into engagement, as above explained, the current in passing through wire 45 will energize the electromagnet 46 and the armature 47 will be attracted. A circuit will then be made from terminal 21, through switch 48, armature 47, to contact 50, coil 46, and then to terminal 22. This short circuit will then be maintained even when the needle falls toward its zero position and when the contacts 40 44 are separated. When the switch 48 is opened, the armature 47 will be moved away from contact 50, and the switch may again be closed, thus placing the instrument in operative condition. Fig. 10 shows the contacts 40 44 located in the path of the indicating-needle 31.

Fig. 9 illustrates an arrangement similar to that shown in Fig. 8, except that the switch 48 is replaced by a switch which is automatically opened by the indicating-needle. On an insulating-block 52 are mounted the two conducting-strips 53 54, which are in engagement by reason of the strip 53 pressing lightly against the end of strip 54. These parts are so mounted on the instrument that the strip 53 is in the path of the needle when it reaches the zero-point, and the strips 53 and 54 are then disengaged. This will cause armature 47 to be moved away from contact 50, and current may then pass through the conductor 14, as before. With this arrangement the needle will fluctuate from the zero position to the maximum deflection until the overload is removed. Fig. 11 shows the contacts 40, 44, and 53 located in the path of the indicating-needle 31.

Although I have shown and described a specific embodiment of my invention, I am not limited to this construction, and modifications, and changes may be made without departing from the spirit of the claims.

I claim as my invention—

1. In an electrical measuring instrument, the combination of a current-carrying wire, a compensating wire, a movable element to the opposite sides of which two ends of said wires are connected, yieldable means to which the opposite ends of said wires are connected, and means for multiplying and transmitting the movement of said movable element to an indicating-needle, substantially as described.

2. In an electrical measuring instrument, the combination of a current-carrying wire, a compensating wire, a movable element to which said wires are connected, yieldable means for placing tension on said wires, a vane carried by said movable element, a pivoted indicating-needle, and a fiber engaging the shaft of said needle and attached to one end of said vane.

3. In an electrical measuring instrument, the combination of a current-carrying wire, a compensating wire, a movable element to the opposite sides of which two ends of said wires are connected, yieldable means to which the opposite ends of said wires are connected, a vane carried by said movable element, a pivoted indicating-needle, and a fiber engaging the shaft of said needle and attached to one end of said vane, substantially as described.

4. In an electrical measuring instrument, the combination of a current-carrying wire, a compensating wire, a movable element to the opposite sides of which two ends of said wires are connected, yieldable means to which the opposite ends of said wires are connected, a dampening device, and means for indicating the movement of said movable element, substantially as described.

5. In an electrical measuring instrument, the combination of a current-carrying wire and a compensating wire, a movable element to the opposite sides of which two ends of said wires are connected, a pivoted member to which the other two ends of said wires are connected, a spring connected to said pivoted member, and means for indicating the movement of said movable element, substantially as described.

6. In an electrical measuring instrument, the combination of a current-carrying wire, a compensating wire, a movable element to the opposite sides of which two ends of said wires are connected, yieldable means for placing tension on said wires, a pivoted shaft carrying an indicating-needle, a vane carried by said movable element, and a fiber connecting said vane and said shaft, substantially as described.

7. In an electrical measuring instrument, the combination of a current-carrying wire and a compensating wire, a movable element to the opposite sides of which two ends of said wires are connected, yieldable means for placing tension on said wires, a dampening device, a pivoted shaft carrying an indicating-needle, a vane carried by said movable element, and a fiber connecting said vane and shaft, substantially as described.

8. In an electrical measuring instrument, the combination of a current-carrying wire and a compensating wire, a movable element to the opposite sides of which two ends of said wires are connected, a pivoted member to which the other two ends of said wires are connected, a spring connected to said pivoted member, a pivoted shaft carrying an indicating-needle, a fiber for turning said pivoted shaft, and a vane carried by said movable element to which vane the said fiber is connected, substantially as described.

9. In an electrical measuring instrument, the combination of a current-carrying wire and a compensating wire, a movable pin on the opposite sides of which two ends of said wires are connected, a pivoted member to which the other two ends of said wires are connected, a spring connected to said pivoted member, and means for multiplying and transmitting the movement of said movable pin to an indicating-needle, substantially as described.

10. In an electrical measuring instrument, the combination of a current-carrying wire, a compensating wire, a movable element to the opposite sides of which two ends of said wires are connected, yieldable means for placing tension on said wires, a pivoted shaft carrying an indicating-needle, a conductor carried by said shaft, means for producing a magnetic field in the presence of said conductor, and means for transmitting the movement of said movable element to said shaft.

11. In an electrical measuring instrument, the combination with the current-carrying part, of means in the path of the indicating-needle for short-circuiting said part.

12. In an electrical measuring instrument, the combination with the current-carrying part, of means in the path of the movable indicating part for automatically short-circuiting said current-carrying part upon the occurrence of excessive current through the instrument.

13. In an electrical measuring instrument, the combination with the current-carrying part, of means for automatically short-circuiting said part upon the occurrence of excessive current through the instrument, and means for maintaining the short circuit.

14. In an electrical measuring instrument, the combination with the current-carrying part, of means for short-circuiting said part upon the occurrence of excessive current through the instrument and for maintaining said short circuit, substantially as described.

15. In an electrical measuring instrument, the combination with the current-carrying part, a relay device for short-circuiting said part, and means in the path of a movable part of said instrument for operating said relay upon the occurrence of excessive current through the instrument.

16. In an electrical measuring instrument, the combination with the current-carrying part, of means for short-circuiting said part upon the occurrence of excessive current through the instrument, and means for removing the short circuit when the indicating part returns to its initial position.

In testimony whereof I affix my signature in presence of two witnesses.

FRANK W. ROLLER.

Witnesses:
L. K. SAGER,
JULIAN S. WOOSTER.